April 14, 1970 P. M. FRISTEDT 3,506,324
DRAWING BOARD DEVICE
Filed Dec. 20, 1967

INVENTOR.
PAUL M. FRISTEDT
BY
Alan H. Greenberg
ATTORNEY

United States Patent Office 3,506,324
Patented Apr. 14, 1970

3,506,324
DRAWING BOARD DEVICE
Paul M. Fristedt, 7760 48th Ave. N,
Minneapolis, Minn. 55428
Filed Dec. 20, 1967, Ser. No. 692,106
Int. Cl. A47b 27/00; B43k 31/00
U.S. Cl. 312—231          10 Claims

ABSTRACT OF THE DISCLOSURE

A drawing board device comprised of a relatively deep tray including an internal rim. A drawing board is adapted to fit inside the tray but is held away from the bottom of the tray by the rim. The drawing board has at least one side prepared as a slate board for chalk and may have the other side as a slate board or as a wax board for crayons. A receptacle is removably attached to the drawing board to hold chalk and crayons.

---

This invention relates to a drawing board device and more particularly to a means for storing drawing materials and holding a drawing board in position.

Drawing board devices known to the art are not provided with storage means as the present invention is, nor do they have the simple receptacle for holding drawing implements in an accessible position as is provided in the present invention.

The device of the present invention provides a simple means for providing the user with a storage means for color crayons, chalk and other drawing implements as well as coloring books and paper. The top surface of the board may be used as a support for coloring books or paper, or as a drawing surface as on the chalk board.

Referring now to the drawings.

Figure 1:
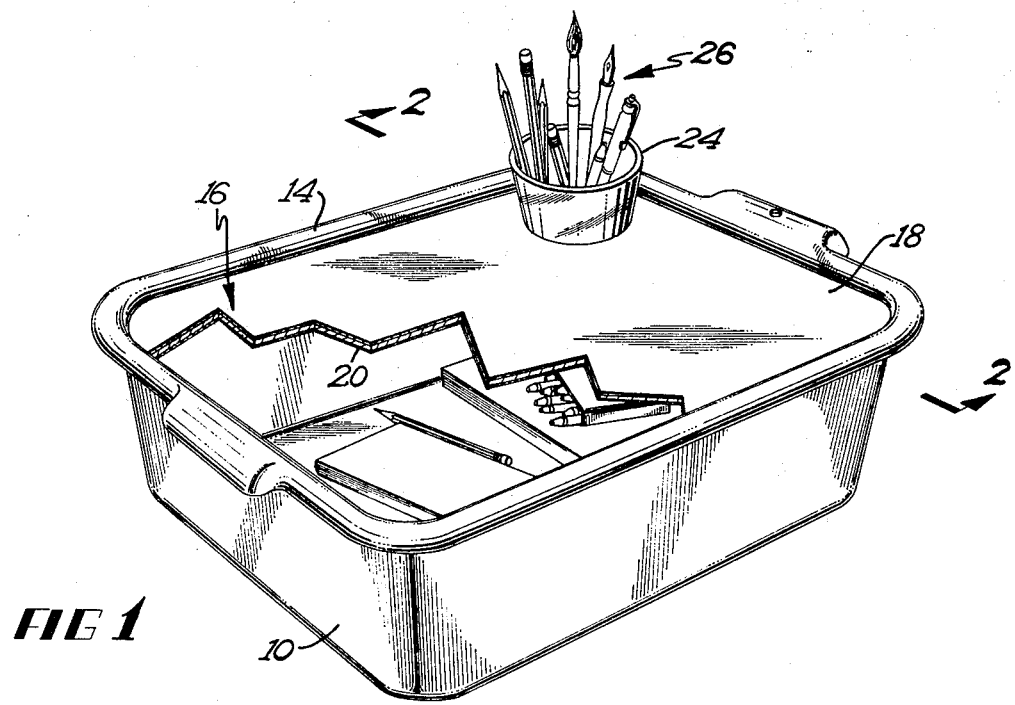
FIGURE 1 is a pictorial view of the device set up for use. A portion of the drawing board is cut away to better illustrate the storage capabilities of the invention.
Figure 2:
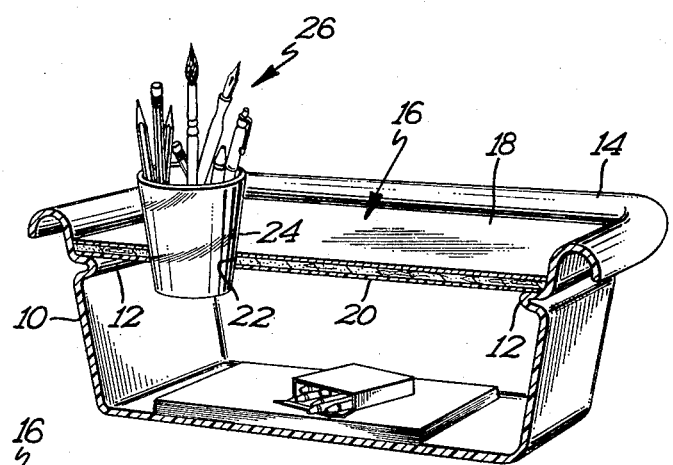
FIGURE 2 is a pictorial section taken along the line and direction of the arrows 2—2 in FIGURE 1.
Figure 3:
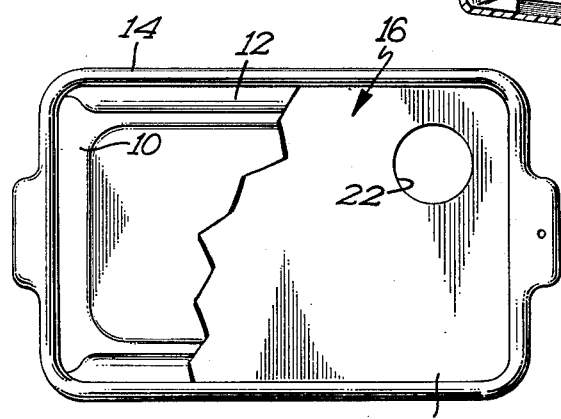
FIGURE 3 is a top view of the device with a portion of the drawing board cut away for clarity.

A storage means, as for instance the relatively deep tray 10, forms the basis of this invention. The tray 10 may be formed of any suitable material but a very desirable one has been found to be a high density polyethylene which allows great flexability without breakage as would be desirable in a child's toy.

An internal rim 12, generally parallel to the periphery 14 of tray 10, is provided. The function of rim 12 is to position and hold a drawing board 16. Rim 12 is shown molded as an integral part of tray 12 but may be attached as a separate item if such is expedient in manufacturing. The drawing board 16 is of such a dimension which will allow it to fit into the tray 10 and be retained by rim 12 so that it will not go to the bottom of tray 10. Drawing board 16 is provided with at least one surface 18 prepared as a slate board. Surface 18 may be prepared by employing a slate paint or an actual piece of slate laminated onto the board 16. The surface 20 may either be a second slate board or a wax surface for facilitating drawing and removal of color crayon marks.

A hole 22 is provided in board 16 to removably secure a drawing implement receptacle as for instance the tumbler 24. A tapered tumbler is shown as being used with this device so that it can go down into the board without falling through. The drawing implements 26, it will be readily appreciated, may be placed into the receptacle or tumbler 24 and stored there for convenient usage by the user of the device.

In use, color crayons, pens, pencils, chalk, coloring books and paper may be stored inside tray 10, as is apparent in FIGURE 1. When the user desires to use the device he may take the tumbler 24, which may also be stored in tray 10, out and fill it with writing and drawing implements 26 as will be needed. If coloring books or papers are to be used they may be removed from tray 10 at that time also. The drawing board 16 is replaced in position on rim 12 and tumbler 24 is placed in position in hole 22. The device may now be used. The device may be set on a table top and employed as such or may be placed in the users lap as when a child is riding in an automobile.

The provision of the slate surface allows a user to employ chalk and readily erase it after he has finished his drawing and draw a new drawing. The provision of the wax surface would allow the user to employ color crayons on the reverse side by turning that side upward and placing the slate toward rim 12. The wax surface would facilitate receiving and removing color crayon marks.

While the device as shown is the preferred embodiment, it is to be realized and appreciated that many other configurations may be developed and evolved which embody the spirit of this invention.

I claim:

1. A drawing board device comprising: an equipment storage means having a bottom, generally upright walls terminating in a top edge surrounding an open top, a board positioning means secured to the inside of at least two of said walls below the top edge and adapted to position and hold a drawing board in place; a drawing board adapted to fit into the top of said storage means and be held in position away from the bottom by said board positioning means, said drawing board including at least one surface prepared for receiving marks of commonly used drawing implements and to facilitate removal of the marks; receptacle means adapted to be removably secured to said drawing board, said receptacle means adapted to receive and to selectively retain drawing implements in a position with convenient access to the user of the drawing board device.

2. The drawing board device of claim 1 further characterized by said storage means comprising a relatively deep tray and said board positioning means comprising an internal rim secured to said tray generally parallel to and below said top edge of said tray.

3. The drawing board device of claim 2 wherein said drawing board is of dimensions slightly smaller and approximating size and shape the open top of said tray, said drawing board being further characterized by means for removably securing said receptacle means being provided on each side of said board.

4. The drawing board device of claim 3 wherein at least one surface of said drawing board is a slate type face adapted to receive and facilitate erasure of chalk marks.

5. The drawing board device of claim 3 wherein at least one surface of said drawing board is a prepared surface adapted to receive and facilitate removal of crayon marks.

6. A drawing board device comprising: a relatively deep storage tray adapted to store drawing supplies; a board positioning means comprising a rim internally secured to said tray and generally parallel to the periphery of said tray; and, a drawing board adapted to fit into the opening of said tray and to be held away from the bottom of said tray by said board positioning means, said board including on each side thereof means for removably securing a drawing implement receptacle, said board including at least one surface adapted to receive and facilitate removal of marks from common drawing implements.

7. The drawing board device of claim 6 further characterized by at least one surface of said drawing board having a slate type finish adapted to receive and facilitate removal of chalk marks.

8. The drawing board device of claim 6 further characterized by at least one surface of said drawing board having a wax type finish adapted to receive and facilitate removal of crayon marks.

9. The drawing board device of claim 6 wherein: said tray has a bottom, upright walls, and a top peripheral edge surrounding the open top of the tray, said rim projected inwardly from at least two opposite walls below said edge and above said bottom.

10. The drawing board device of claim 9 wherein: said drawing board is of a dimension approximating the size and shape of the open top of said tray whereby said drawing board fits into said open top and engages said inwardly projected rim.

References Cited

UNITED STATES PATENTS

| | | | |
|---|---|---|---|
| 1,009,995 | 11/1911 | Reusche | 206—1.7 |
| 3,082,049 | 3/1963 | Lifton | 312—231 X |
| 3,167,177 | 1/1965 | Lewis | 206—1.7 |
| 3,280,966 | 10/1966 | Boniface | 206—1.7 |

CASMIR A. NUNBERG, Primary Examiner

U.S. Cl. X.R.

206—17.1, 1.7; 312—230